(12) United States Patent
Barboi

(10) Patent No.: US 12,717,888 B2
(45) **Date of Patent: *Aug. 25, 2026**

(54) PASSWORDLESS SECURE AUTHENTICATION

(71) Applicant: CyberArk Software Ltd., Petach-Tikva (IL)

(72) Inventor: Dima Barboi, Tel Aviv (IL)

(73) Assignee: CyberArk Software Ltd., Petach-Tikva (IL)

( * ) Notice: Subject to any disclaimer, the term of this patent is extended or adjusted under 35 U.S.C. 154(b) by 90 days.

This patent is subject to a terminal disclaimer.

(21) Appl. No.: 18/969,667

(22) Filed: Dec. 5, 2024

(65) Prior Publication Data

US 2025/0103697 A1 Mar. 27, 2025

Related U.S. Application Data

(63) Continuation of application No. 18/400,591, filed on Dec. 29, 2023, now Pat. No. 12,259,959, which is a (Continued)

(51) Int. Cl.

*G06F 21/33* (2013.01)
*G06F 21/32* (2013.01)

(Continued)

(52) U.S. Cl.

CPC ............ *G06F 21/335* (2013.01); *G06F 21/32* (2013.01); *G06F 21/604* (2013.01);

(Continued)

(58) Field of Classification Search

CPC ...... G06F 21/335; G06F 21/32; G06F 21/604; H04L 67/141

See application file for complete search history.

(56) References Cited

U.S. PATENT DOCUMENTS 8,116,455 B1 2/2012 Sussland
8,508,338 B1 * 8/2013 Fiddy ............... G06Q 20/40145 340/5.82

(Continued)

FOREIGN PATENT DOCUMENTS

WO WO 2008082337 A1 7/2008
WO WO 2018064765 A1 4/2018

OTHER PUBLICATIONS

Marxen, et al., "Ensuring system security through proximity based authentication," 2017 22nd Asia and South Pacific Design Automation Conference (ASP-DAC) Year: 2017 | Conference Paper | Publisher: IEEE.*

(Continued)

*Primary Examiner* — Roderick Tolentino

(74) *Attorney, Agent, or Firm* — Finnegan, Henderson, Farabow, Garrett & Dunner, LLP

(57) ABSTRACT

Disclosed embodiments relate to passwordless authentication. Techniques include identifying a request by a user to access an access-restricted target resource, the user operating on a client computing device and the request being associated with a network address for the access-restricted target resource; intercepting the request; generating a unique session identifier for the user; making available the unique session identifier to the user of the client computing device; performing dual-mode, passwordless authentication of the user; confirming, based on the dual-mode, passwordless authentication of the user, the identity of the user and the user's current use of the client computing device; and permitting, based on the confirmation, the user to access the access-restricted target resource.

20 Claims, 10 Drawing Sheets

Related U.S. Application Data continuation of application No. 16/059,556, filed on Aug. 9, 2018, now Pat. No. 11,907,354.

(51) Int. Cl.

| | |
|---|---|
| ***G06F 21/60*** | (2013.01) |
| ***H04L 9/40*** | (2022.01) |
| ***H04L 67/141*** | (2022.01) |

(52) U.S. Cl.

CPC ........ *H04L 63/0227* (2013.01); *H04L 63/107* (2013.01); *H04L 67/141* (2013.01); *G06F 2221/2105* (2013.01)

(56) References Cited

U.S. PATENT DOCUMENTS

| | | | | |
|---|---|---|---|---|
| 8,819,810 | B1 | 8/2014 | Liu | |
| 9,491,183 | B1 * | 11/2016 | Dippenaar | G06F 21/41 |
| 9,537,661 | B2 * | 1/2017 | Khalil | H04L 63/0876 |
| 10,019,591 | B1 | 7/2018 | Beguin | |
| 10,374,815 | B2 | 8/2019 | Biggs et al. | |
| 2006/0294388 | A1 | 12/2006 | Abraham et al. | |
| 2007/0300080 | A1 | 12/2007 | Brown | |
| 2009/0183247 | A1 | 7/2009 | Kasper et al. | |
| 2014/0157381 | A1 | 6/2014 | Disraeli | |
| 2014/0223525 | A1 * | 8/2014 | Fadida | G06F 21/35 726/6 |
| 2014/0282961 | A1 | 9/2014 | Dorfman et al. | |
| 2014/0373138 | A1 * | 12/2014 | Park | H04L 63/1458 726/22 |
| 2015/0089604 | A1 * | 3/2015 | Mathew | H04L 65/1069 709/228 |
| 2016/0070898 | A1 * | 3/2016 | Kwok-Suzuki | G06F 21/316 726/7 |
| 2016/0218875 | A1 | 7/2016 | Le Saint | |
| 2017/0011220 | A1 * | 1/2017 | Efremov | G06F 21/577 |
| 2017/0118025 | A1 | 4/2017 | Shastri et al. | |
| 2017/0134357 | A1 * | 5/2017 | Ohlsson | H04L 63/166 |
| 2017/0180351 | A1 | 6/2017 | Lu et al. | |
| 2017/0264608 | A1 * | 9/2017 | Moore | G07C 9/257 |
| 2018/0278594 | A1 | 9/2018 | Schiffman | |
| 2018/0295190 | A1 * | 10/2018 | Lu | H04L 67/146 |
| 2019/0028281 | A1 | 1/2019 | Turissini | |
| 2019/0215308 | A1 * | 7/2019 | Feyzibehnagh | H04L 63/0428 |
| 2019/0238323 | A1 | 8/2019 | Bunch et al. | |
| 2020/0007531 | A1 * | 1/2020 | Koottayi | H04L 67/146 |
| 2020/0026834 | A1 * | 1/2020 | Vimadalal | G06F 16/9024 |

OTHER PUBLICATIONS

Juuti et al., "Implementing Prover-Side Proximity Verification for Strengthening Transparent Authentication," 2017 14th Annual IEEE International Conference on Sensing, Communication, and Networking (SECON) Year: 2017 | Conference Paper | Publisher: IEEE.*

Li et al., "A Proximity Authentication System for Smartphones," IEEE Transactions on Dependable and Secure Computing Year: 2016 | vol. 13, Issue: 6 | Journal Article | Publisher: IEEE.*

Marxen, et al., "Ensuring system security through proximity based authentication," 2017 22nd Asia and South Pacific Design Automation Conference (ASP-DAC) Year: 20171 Conference Paper | Publisher: IEEE.

Juuti et al., "Implementing Prover-Side Proximity Verification for Strengthening Transparent Authentication," 2017 14th Annual IEEE International Conference on Sensing, Communication, and Networking (SECON) Year: 20171 Conference Paper | Publisher: IEEE.

Communication and Search Report, issued from the European Patent Office in corresponding Application No. 19166849.0-1218, dated May 24, 2019 (9 pages).

* cited by examiner

300

PASSWORDLESS SECURE AUTHENTICATION

CROSS-REFERENCE TO RELATED APPLICATIONS

This application is a continuation of and claims priority to U.S. application Ser. No. 18/400,591, filed on Dec. 29, 2023, which is a continuation of U.S. application Ser. No. 16/059,556, filed on Aug. 9, 2018, the entireties of which are both incorporated herein by reference.

BACKGROUND

Many common security techniques are based on outdated notions of enterprises having well-controlled and clearly defined perimeters. In such environments, firewalls were the primary security tool to protect computing resources within the enterprise. But in modern environments, applications are increasingly being hosted in cloud-based systems, rather than through on-premises infrastructure within an enterprise. Further, many users of computing devices are moving outside the perimeters of enterprises to perform their computing activities. Consequently, many legacy security techniques are not only costly, complex, cumbersome, and ineffective, but they also lead to security vulnerabilities.

Security approaches that rely on all users being within an enterprise perimeter create risks because they allow for unrestricted lateral movement by users within the enterprise. This includes connecting from computer to computer, to applications, and to other resources. Further, such approaches often require a hole in a firewall for outside communications, which is also a risk. Moreover, these approaches limit user freedom, movement, and productivity. They thus result in a poor user experience, require significant IT overhead within the enterprise, and lack visibility into users' actual use of applications.

Other existing security techniques are inadequate in terms of their usability, flexibility, security performance, and speed. For example, some techniques allow users to authenticate themselves through biometrics. Nevertheless, when biometrics alone are used, they are vulnerable in terms of attacks that duplicate biometric information or hashes of such information. Similarly, some techniques rely on the use of passwords. But passwords are also vulnerable to theft or duplication, and further require users to memorize them on a continuous and changing basis. Indeed, passwords are often the weakest link in a security regime. Passwords further require management and IT burdens. Other techniques attempt to authenticate users based on observed environmental factors or calculated risk factors, such as geographic location and user activity. Yet these techniques are prone to false positives and false negatives, and require complex sets of rules to implement.

There are thus technological needs for systems and methods that more securely, flexibly, and quickly authenticate users seeking access to network-restricted resources. It would be advantageous for solutions to not rely on the presence of an agent running on an endpoint device in all situations. Further, it would be advantageous for such solutions to not require passwords or other authentication credentials that users must memorize or supply. It would also be advantageous to allow client devices to access controlled target network resources, following passwordless authentication, without directly connecting the client device to the target resources. In addition, it would be advantageous for such solutions to operate with various different types of identification and verification technologies and protocols. Such solutions may also advantageously utilize authentication techniques such as biometric recognition, voice recognition, body or movement sensing, and artificial intelligence techniques. It may also be advantageous for such solutions to be transparent to users of client devices, to the client devices they are using, or to target network resources they are accessing. Further, in situations where such solutions are implemented using an application (e.g., a mobile app), it may be advantageous to separate any confidential or biometric information about the user from the application itself, and instead store only public or non-sensitive user information in the app (e.g., name, title, contact information, etc.).

SUMMARY

The disclosed embodiments describe non-transitory computer readable media and methods for passwordless authentication of users. For example, in an exemplary embodiment, there may be a non-transitory computer readable medium including instructions that, when executed by at least one processor, cause the at least one processor to perform operations for passwordless authentication of a user. The operations may comprise identifying a request by a user to access an access-restricted target resource, the user operating on a client computing device and the request being associated with a network address for the access-restricted target resource; intercepting the request before the request can reach the access-restricted target resource; generating a unique session identifier for the user; making available the unique session identifier to the user of the client computing device; performing dual-mode, passwordless authentication of the user, including: confirming a result of a physical authentication of the user based on one or more unique physical characteristics of the user, receiving, from the client computing device, the unique session identifier that was made available to the user, and validating the received unique session identifier with respect to the result of the physical authentication; confirming, based on the dual-mode, passwordless authentication of the user, the identity of the user and the user's current use of the client computing device; and permitting, based on the confirmation, the user to access the access-restricted target resource.

According to a disclosed embodiment, the client computing device stores identity information associated with the user, and the operations further comprise receiving the identity information from the client computing device.

According to a disclosed embodiment, the intercepting includes redirecting the request to a network address associated with an authentication system that generated the unique session identifier.

According to a disclosed embodiment, the intercepting includes receiving the request at a proxy server that is configured to filter communications between the client computing device and the access-restricted target resource.

According to a disclosed embodiment, the intercepting includes receiving the request at a local agent on the client computing device that is configured to filter communications between the client computing device and the access-restricted target resource.

According to a disclosed embodiment, the intercepting includes redirecting the request to a portal provided by an authentication system that generated the unique session identifier.

According to a disclosed embodiment, the operations further comprise, conditional on successful physical authentication of the user and successful validation of the unique session identifier, establishing a secure tunnel connection between the client computing device and the access-restricted target resource.

According to a disclosed embodiment, the unique session identifier is a bar code.

According to a disclosed embodiment, the unique session identifier is a sequence of alphanumeric characters.

According to a disclosed embodiment, the operations further comprise prompting the user to optically scan the unique session identifier for validation.

According to a disclosed embodiment, the unique session identifier is a one-time-use session identifier.

According to another disclosed embodiment, a method may be implemented for passwordless authentication of a user. The method may comprise identifying a request by a user to access an access-restricted target resource, the user operating on a client computing device and the request being associated with a network address for the access-restricted target resource; intercepting the request before the request can reach the access-restricted target resource; generating a unique session identifier for the user; making available the unique session identifier to the user of the client computing device; performing dual-mode, passwordless authentication of the user, including: confirming a result of a physical authentication of the user based on one or more unique physical characteristics of the user, receiving, from the client computing device, the unique session identifier that was made available to the user, and validating the received unique session identifier with respect to the result of the physical authentication; confirming, based on the dual-mode, passwordless authentication of the user, the identity of the user and the user's current use of the client computing device; and permitting, based on the confirmation, the user to access the access-restricted target resource.

According to another disclosed embodiment, the physical authentication of the user includes a biometric or biological identification of the user.

According to another disclosed embodiment, the biometric identification is based on a comparison of biometric information provided by the user with stored biometric information associated with the user, the stored biometric information associated with the user being maintained in a secure memory of the client computing device.

According to another disclosed embodiment, the biometric identification is based on a comparison of biometric information provided by the user with stored biometric information associated with the user, the stored biometric information associated with the user being maintained remote from the client computing device.

According to another disclosed embodiment, making available the unique session identifier to the user includes sending a web-based document to the client computing device including the unique session identifier.

According to another disclosed embodiment, making available the unique session identifier to the user includes presenting a graphical user interface to the client computing device that includes the unique session identifier.

According to another disclosed embodiment, the client computing device is a mobile device, and the physical authentication is performed by a security application running on the mobile device.

According to another disclosed embodiment, the method further comprises, conditional on successful physical authentication of the user and successful validation of the unique session identifier, logging the user in to an application running on the access-restricted target resource.

According to another disclosed embodiment, the confirming the result of the physical authentication and the validation of the unique session identifier are performed simultaneously.

According to another disclosed embodiment, the method further comprises referencing an access policy that determines how to establish a secure connection between the client computing device and the access-restricted target resource.

According to another disclosed embodiment, the authentication system maintains an access policy that determines a geographical location of the user and makes the determination of whether the user is permitted to access the access-restricted target resource based at least in part on the geographical location.

Additional disclosed embodiments relate to a computer-implemented method for passwordless authentication of a user of a client computing device. The method may comprise sending a request, from the client computing device, for a user of the client computing device to access an access-restricted target resource, the request being associated with a network address for the access-restricted target resource; receiving, from a security server and in response to the request, a unique session identifier for the user; performing steps to enable dual-mode, passwordless authentication of the user, the steps including: performing a physical authentication of the user based on one or more unique physical characteristics of the user, and returning, to the security server for validation with respect to a result of the physical authentication, the received unique session identifier; and conditional on a successful dual-mode, passwordless authentication of the user by the security server, accessing the access-restricted target resource.

According to another disclosed embodiment, the method further comprises accessing the access-restricted target resource through a secure tunnel that was established by the security server.

According to another disclosed embodiment, the method further comprises accessing a secure memory of the client computing device storing identity information associated with the user; and providing the identity information to the security server together with the received unique session identifier.

According to another disclosed embodiment, the method is performed by a security application running on the client computing device.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The various implementations described herein overcome the deficiencies in usability, security performance, and speed associated with prior security techniques. In particular, as discussed below, disclosed techniques allow for users of client computing devices to authenticate themselves in a seamless, passwordless manner, and without compromising security or the user experience.

Reference will now be made in detail to the disclosed embodiments, examples of which are illustrated in the accompanying drawings.

Figure 1:
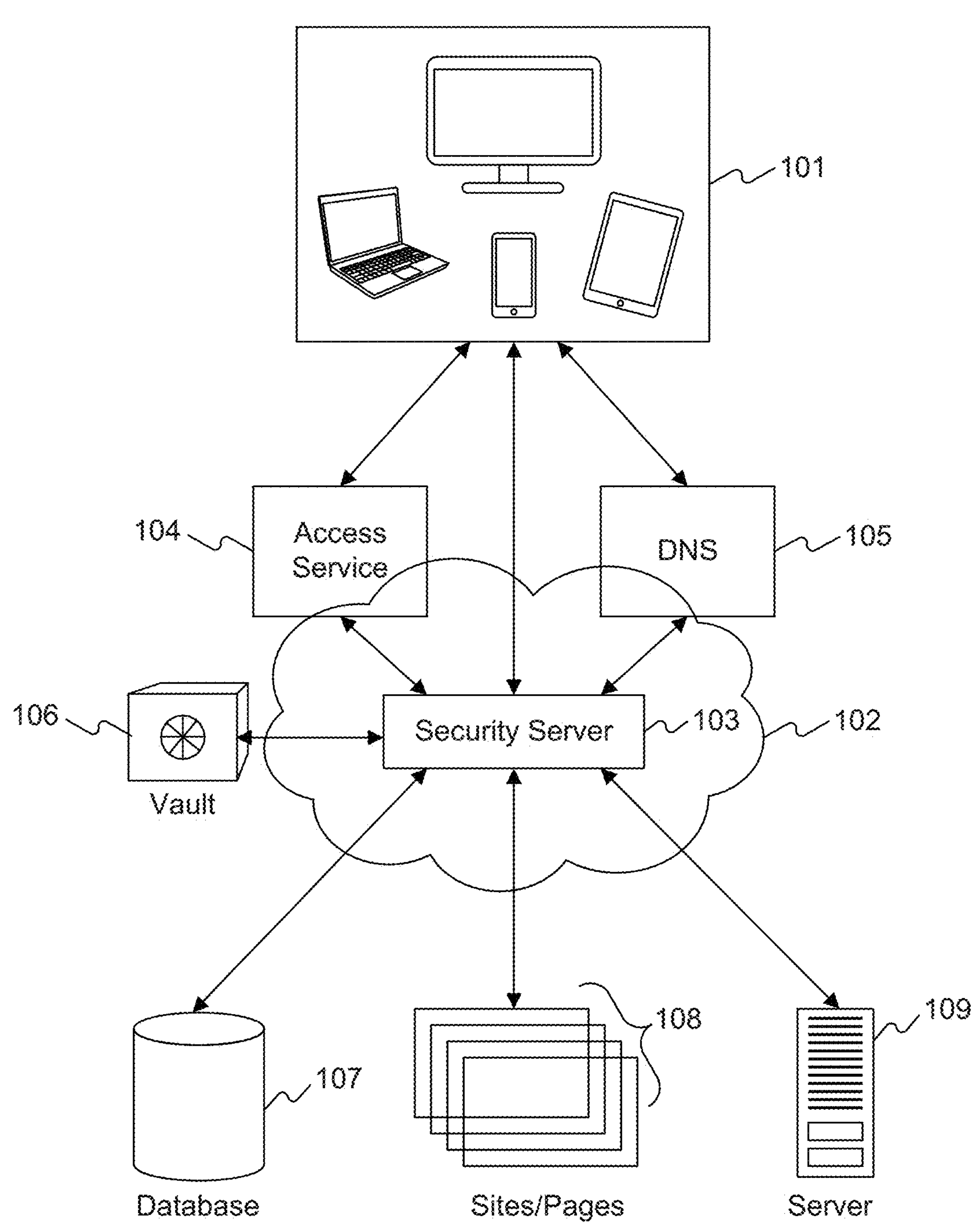
FIG. 1 is a block diagram of an example system, in accordance with disclosed embodiments.

FIG. 1 is a block diagram of an example system 100 for passwordless authentication of users consistent with disclosed embodiments. As shown, system 100 includes a plurality of client computing devices 101 that may communicate through a network 102 with one or more access-restricted target resources 107-109, such as a secure database 107, websites or pages enabling users to interact with remotely hosted secure applications 108, and secure servers 109. Access to access-restricted target resources 107-109 may be controlled, at least in part, by security server 103. As discussed further below, in some embodiments security server 103 may also communicate with an access service 104, DNS server 105, and secure credential vault 106.

Client computing devices 101 may be a variety of different types of computing devices with network communications capabilities. Examples include personal computers, laptops, mobile computing devices (e.g., smartphones), tablets, IoT devices, wearable computer devices (e.g., smart clothing, smart watches, smart jewelry, etc.), automotive computer devices, smart home appliances, etc. As discussed further below, such client computing devices 101 may include hardware processors and memories for storing data and/or software instructions, as well as communications interfaces for exchanging data with remote servers (e.g., security server 103 and target resources 107-109). As discussed further below, client computing devices 101 may also have software and hardware (e.g., cameras, fingerprint sensors, heartrate monitors, accelerometers, etc.) configured to perform physical authentication of a user of a client computing device 101, audio recording and playback capabilities, and graphics capabilities for rendering visual content on a display screen.

Network 102 may be based on any type of computer networking arrangement used to exchange data, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile network, a private data network, a virtual private network using a public network, a nearfield communications technique (e.g., Bluetooth, infrared, etc.) that enables the system 100 to send and receive information between the components in the system 100. In some embodiments, network 102 may include two or more of these forms of communications. As an example, client computing devices 101 may communicate with security server 103 via Bluetooth or RFID, while security server 103 communicates with access service 104, DNS server 105, or vault 106 via WiFi or the Internet. Of course, different combinations are possible as well.

Target network resources 107-109 may include one or more access-restricted resources, such as secure database 107, sites or pages 108 that allow a user to interact with a remote application, or a secure server 109. An access-restricted target resource 107-109 may be any secure device, application, database, server, and/or network that requires a user (e.g., user of client computing device 101) to be authenticated before accessing the resource. As examples of access-restricted target resources 107-109, secure database 107 may hold confidential corporate data, such as financial or technical information. Sites and pages 108 may be, for example, virtualized instances of applications running in a cloud-computing environment, such as a cloud platform based on MICROSOFT AZURE, AMAZON WEB SERVICES (AWS), GOOGLE CLOUD PLATFORM, IBM CLOUD, or similar systems. Such applications may thus be accessed on-demand by users through the techniques discussed below. Secure server 109 may be a secure web hosting server, web development server, cybersecurity server, human resources server, competitive intelligence server, or various other types of secure servers capable of communicating with client computing devices 101.

Access service 104 may be a portal or proxy server configured to provide access to access-restricted target resources 107-109. For example, access service 104 may be a web-based portal, an intranet portal, or another type of access point that client computing devices 101 may connect to before being able to access access-restricted target resources 107-109. Similarly, access service 104 may be a proxy server to which client computing devices 107-109 send some or all of their outgoing communications. As discussed further below, access service 104 may be configured to analyze outgoing communications from client computing devices 101 and determine whether they should be intercepted and processed by security server 103. In addition, DNS server 105 may be used to intercept and reroute communications (e.g., by IP address resolution) from client computing devices 101. Various different forms of such interception and rerouting are possible, as discussed further below.

In some embodiments, access service 104 functions to discover identities (e.g., machines, applications, virtualized application instances, and other resources) associated with access-restricted target resources 107-109 or the broader network in which they operate. In many instances, access-restricted target resources 107-109 may be invisible to the public internet, since they are access-protected and secured. Thus, in order for security server 103 to facilitate access between client computing devices 101 and access-restricted target resources 107-109, access service 104 may develop a list or mapping of access-restricted target resources 107-109 (e.g., in terms of their IP address, MAC address, unique resource name, virtual machine identifier, cloud container identifier, serverless code identifier, etc.). In some embodiments, access service 104 may perform this investigation through a directory service (e.g., MICROSOFT ACTIVE DIRECTORY), through a discovery tool (e.g., CYBERARK DNA), through a cloud orchestration application (e.g., AWS CONSOLE, AZURE PORTAL, etc.), or through other techniques.

In some embodiments, a vault 106 may be accessed by security server 103 in establishing secure connections between client computing devices 101 and access-restricted target resources 107-109. For example, as discussed further below, in situations where a user of a client computing device 101 has been successfully authenticated, security server 103 may fetch a secret (e.g., authentication key, credential, token, password, etc.) from vault 106 for authentication of the user (or a corresponding identity or account) to the appropriate access-restricted target resource 107-109. Further, in some embodiments, security server 103 also logs the user or identity into a session at the appropriate access-restricted target resource 107-109, and such a log-in process may involve a secret obtained from vault 106. In other embodiments, vault 106 is not used or communicated with by security server 103. Further, where vault 106 is utilized by security server 103, the secrets stored within vault 106 may not be provided to the user or their client computing device 101. Accordingly, the user of a client computing device 101 may still be able to be authenticated in a passwordless manner to access access-restricted target resources 107-109.

Figure 2:
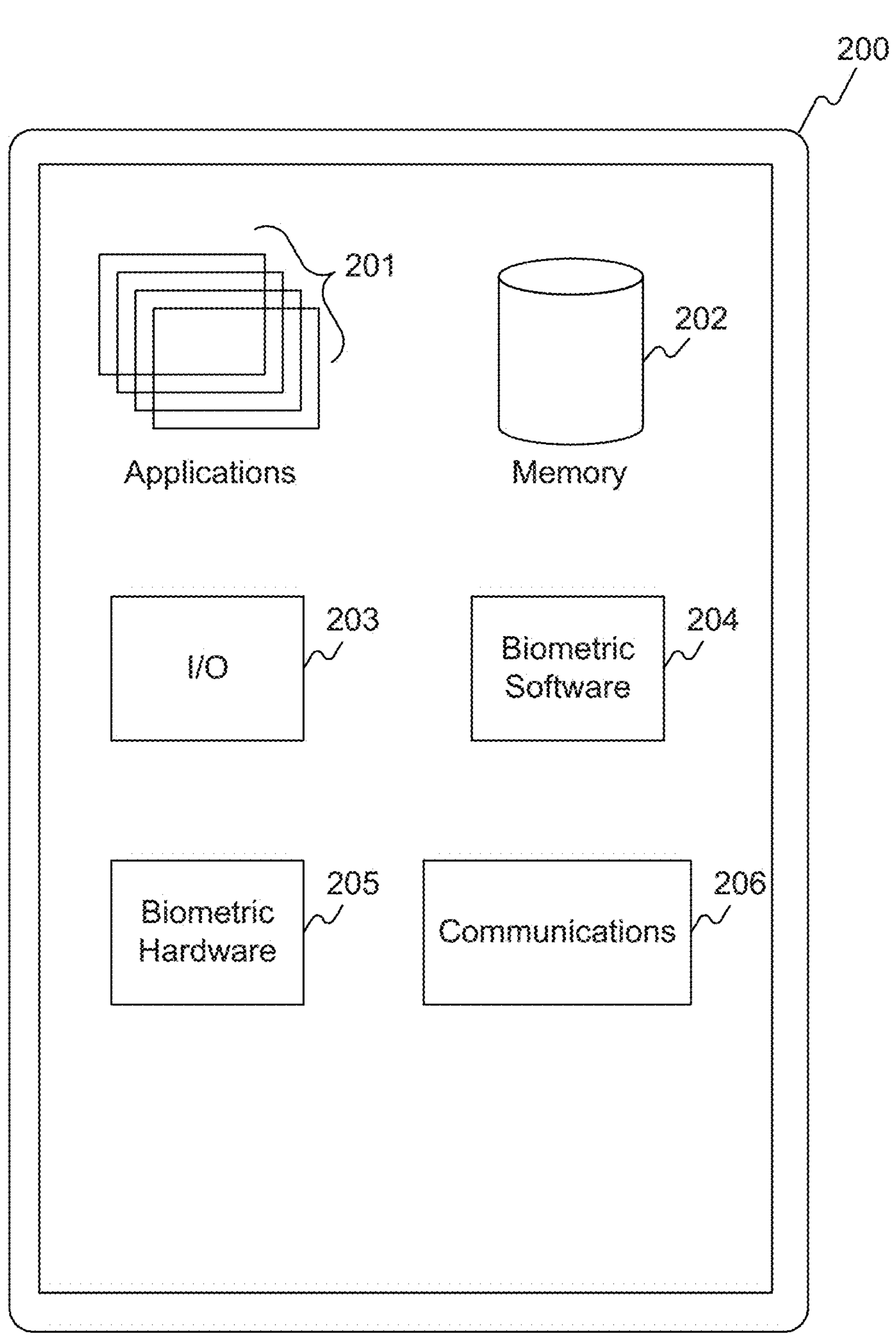
FIG. 2 is a block diagram of an example client computing device, in accordance with disclosed embodiments.

FIG. 2 is a block diagram of an example client computing device 200 consistent with disclosed embodiments. As discussed above, client computing device 200 may be various different types of network-enabled devices, such as the various client computing devices 101 described in connection with FIG. 1.

Client computing device 200 may include one or more applications 201. Examples of applications include business applications (e.g., an ORACLE database application, AMAZON AWS cloud management application, VMWARE virtual machine application, CISCO remote access application, MICROSOFT OUTLOOK email application, proprietary business applications, etc.) and personal applications (e.g., GOOGLE GMAIL, FACEBOOK, TWITTER, LINKEDIN, etc.). Some such applications may have a dual business-personal purpose. In some embodiments, the actual application software resides on the client computing device 200 itself. In other embodiments, the actual applications reside on a remote server (e.g., access-restricted target resources 107-109). In such situations, the application may execute remotely from the client computing device 200, and the application may be selectable by the user via a graphical icon or other representation on the client computing device. Selecting the icon or other representation may instruct client computing device 200 to send a request to access the selected application (e.g., from access-restricted target resources 107-109). As discussed further below, such requests may be intercepted through various techniques before they directly reach access-restricted target resources 107-109.

In some embodiments, applications 201 also include a security application configured to communicate with security server 103 or access service 104. This security application may act as a proxy agent, monitoring outgoing communications from client computing device 200 and determining when a communication is seeking access to access-restricted target resources 107-109. Further, the security application may be configured to route all outgoing communications from client computing device 200 to security server 103 or access service 104. In embodiments where applications 201 include a security application, the security application may also be configured to store a user profile or account associated with one or more users of the client computing device. This profile or account may contain non-confidential information, such as the user's name, title, email address, or other contact information. In some embodiments, the user of the security application is required to authenticate themselves in order to access the application (e.g., using a corporate username and ID, biometrics, security question prompts, etc.). Nevertheless, other embodiments permit the user to access the security application and build their profile or account without authentication.

The security application running on client computing device 200 may further be configured to participate in or facilitate a process of dual-mode, passwordless authentication of the user, as discussed further below in connection with FIGS. 3-10. For example, as discussed below, the security application may provide instructions to the client computing device 200 to perform a physical (e.g., biometric, biological, movement-based, etc.) authentication of the user. Further, the security application may be configured to instruct the client computing device 200 to return to security server 103 or access service 104 a unique session identifier that has been received by the client computing device 200. In the process of facilitating the dual-mode, passwordless authentication of the user, the security application may also instruct the client computing device 200 to use other hardware or software residing on the client computing device 200, such as a camera, fingerprint sensor, accelerometer, gyroscope, etc., as discussed further below.

As shown in FIG. 2, client computing device 200 may also include a memory 202, which may be one or more discrete memory hardware devices. Memory 202 may include one or more hard disk, random access memory (RAM), read-only memory (ROM), erasable programmable read-only memory (EPROM or Flash memory), static random access memory (SRAM), or other forms of memory. Memory 202 may store the applications 201 (or icons thereof) residing on the client computing device 200, an operating system of the client computing device 200 (e.g., ANDROID OS, SAMSUNG BADA, MICROSOFT WINDOWS, APPLE OS, IPHONE OS, LINUX/UNIX, BLACK- BERRY OS, etc.), the user profile or account information discussed above, and various types of biometric software 204.

Biometric software 204 may be one or more applications for authenticating a user in terms of physical traits or characteristics. For example, biometric software 204 may be configured to authenticate a user's face, eye retina, voice, saliva, blood, hair, or fingerprint, among other physical features. Further, biometric software 204 may be configured to authenticate a user in terms of patterns or averages of other physical attributes, such as the user's heartrate, walking cadence or speed, typing or clicking activity, cursor movement, gaze detection or eyeball monitoring, chemical (e.g., pheromone) production, application usage frequency or timing, or environmental characteristics, among other factors. In some embodiments, artificial intelligence or machine learning may be used to determine reliable and distinctive physical attributes of a user that may be observed, analyzed, and used for authentication of the user.

Client computing device 200 may further include input/output device 203, which may include one or more interfaces for physical connections to external devices, sensors, visual rendering devices, or auditory rendering devices. Examples of input/output device 203 include a USB connection (e.g., Type A, Type B, Type C, etc.), Ethernet (e.g., CAT-5) connection, VGA connection, HDMI connection, display screen, touchscreen display, loudspeaker, microphone, camera, gyroscope, accelerometer, GPS, proximity sensor, magnetometer, luxmeter, etc. In some embodiments, some of these forms of input/output devices 203 may also function as biometric hardware 205. For example, a microphone, camera, gyroscope, accelerometer, etc., may be used in the types of physical authentication of a user discussed above.

Communications interface 206 may enable the client computing device 200 to communicate wirelessly with one or more external devices, such as security server 103, access service 104, access-restricted target resources 107-109, and other network resources. Examples of communications interface 206 may include a WiFi transceiver, Bluetooth transceiver, RFID transceiver, infrared transceiver, cellular transceiver, mesh network transceiver, etc. In some embodiments, one or more applications 201 (e.g., a security application, as discussed above) may instruct communications interface 206 to communicate with an external resource (e.g., security server 103, etc.).

Figure 3:
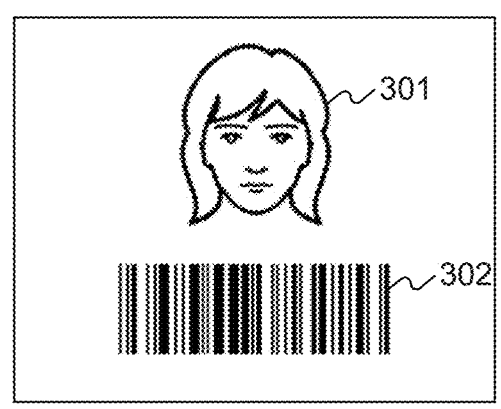
FIG. 3 is an illustration of exemplary forms of information that may be used in dual-mode, passwordless authentication, in accordance with disclosed embodiments.
Figure 3:
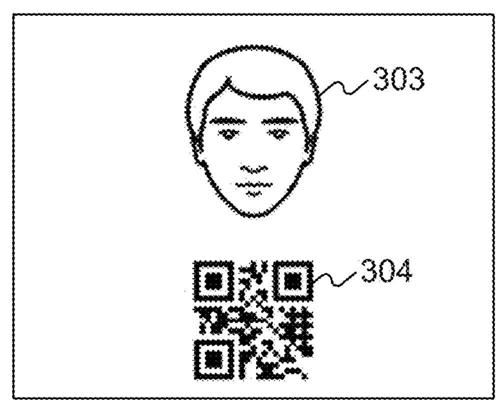
Figure 3:
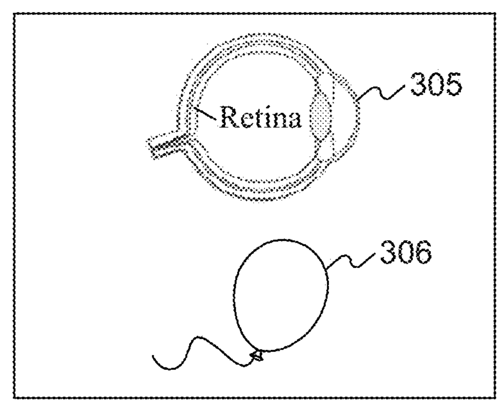
Figure 3:
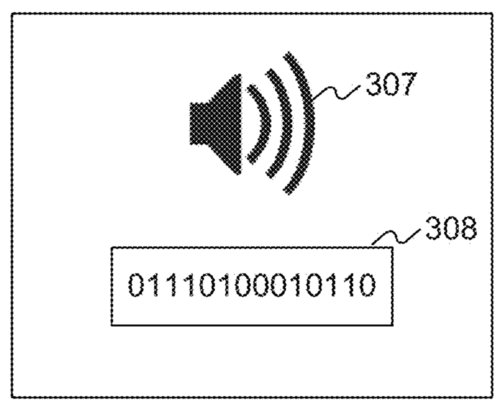
Figure 3:
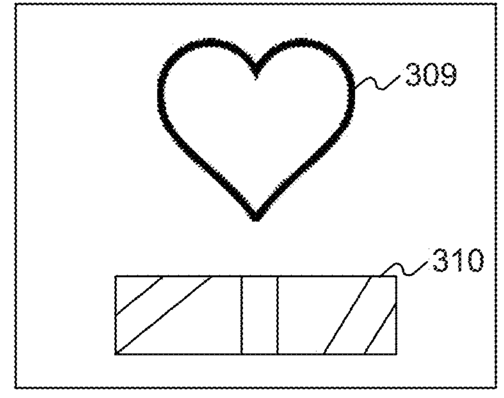
Figure 3:
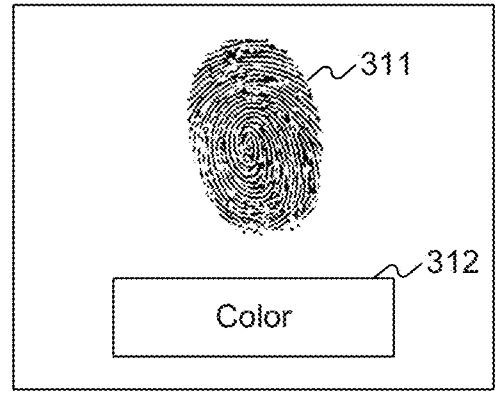

FIG. 3 is an illustration of exemplary forms of information 300 that may be used in dual-mode, passwordless authentication consistent with disclosed embodiments. In particular, as discussed below in connection with processes 400, 500, and 600 of FIGS. 4-6, dual-mode, passwordless authentication of a user may involve a physical authentication process and a return of a unique session identifier that was provided to a client computing device.

As described above, various forms of physical authentication of a user are possible. Utilizing biometric software 204 and hardware 205 of client computing device 200, for example, a user may be authenticated in terms of various physical traits (e.g., biometrics, biological traits, etc.) or characteristics that are observed and analyzed. Further, as discussed below in greater detail, when a client computing device receives a unique session identifier (e.g., from security server 103), the user may operate the client computing device to return the unique session identifier back to the security server 103. In this way, two different forms of authentication of the user may be performed. The physical authentication may validate the presence of the user at the client computing device, and the return of the unique session identifier may validate the particular client computing device that they are currently using. Notably, users may authenticate themselves in this manner without having to supply a password or other secret to security server 103.

As illustrated in FIG. 3, the dual-mode, passwordless authentication may involve a physical identification based on facial recognition 301 and a unique session identifier in the form of a barcode 302. As an alternative, the dual-mode, passwordless authentication may involve a physical identification based on facial recognition 303 and a unique session identifier in the form of a QR code 304. Further, the dual-mode, passwordless authentication may involve a physical identification based on a retinal scan 305 of the user and a unique session identifier in the form of a graphical image or icon 306 (depicted as a balloon). In other embodiments, the dual-mode, passwordless authentication may involve a physical identification based on voice recognition 307 and a unique session identifier in the form of a unique string of characters 308 (e.g., numerical, alphabetical, or alphanumeric). Still further, the dual-mode, passwordless authentication may involve a physical identification based on heart rate analysis 309 (e.g., through pattern detection, AI, machine learning, etc.) and a unique session identifier in the form of a unique graphical pattern 310. As another option, the dual-mode, passwordless authentication may involve a physical identification based on fingerprint recognition 311 and a unique session identifier in the form of a particular color 312 (e.g., red, blue, purple, etc.).

Consistent with the above description of the software and hardware capabilities of a client computing device, other forms of physical authentication of a user may be used in addition or as alternatives to the examples shown in FIG. 3. Similarly, the unique session identifier may be various different types of symbols, graphics, or text that can be returned by a user to security server 103, either with or without decoding by the client computing device. In some embodiments, the user of a client computing device uses a component of the client computing device (e.g., the camera) to scan the unique session identifier and return it to security server 103. Alternatively, the user may read the unique session identifier as displayed on the client computing device and enter it via the client computing device to be returned to the security server 103.

Figure 4:
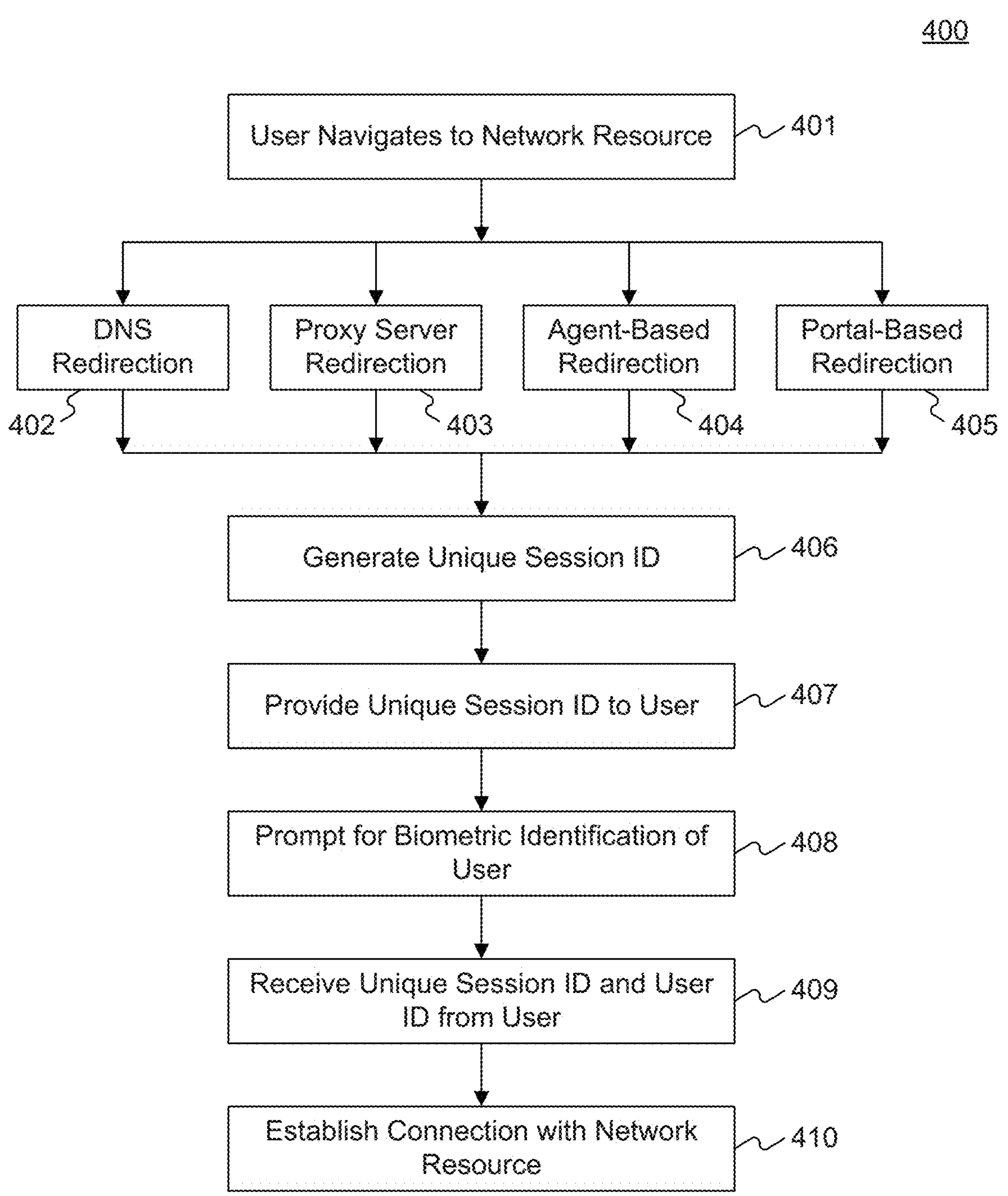
FIG. 4 is a flowchart of passwordless authentication of a user, in accordance with disclosed embodiments.

FIG. 4 is a flowchart of a process 400 for passwordless authentication of a user consistent with disclosed embodiments. Process 400 may be performed in the system environments described herein (e.g., system 100 of FIG. 1, system 700 of FIG. 7, system 800 of FIG. 8, system 900 of FIG. 9, or system 1000 of FIG. 10).

Process 400 may include an operation 401 of determining that a user of a client computing device is attempting to navigate to an access-protected target resource. For example, a security application running on the client computing device may monitor outgoing communications from the client computing device, and detect when the address of such a communication (e.g., based on a domain name, IP address, MAC address, resource name, etc.) matches a list or mapping of access-protected target resources. Additional techniques of identifying that a user of a client computing device is attempting to navigate to an access-protected target resource are described below in connection with operations 402-405. Any of these techniques, or others, may be used to intercept and reroute requests from client computing devices.

In an operation 402, the user's request to navigate to an access-protected target resource may be received and redirected through DNS resolution. For example, in system 100, outgoing requests from a client computing device 101 may be received at a DNS server 105. The DNS server may maintain a listing of addresses (e.g., based on domain name, IP address, MAC address, resource name, etc.) associated with access-protected target resources 107-109. When a request from a client computing device 101 matches such an address, the DNS server 105 may reroute the request to an address associated with security server 103 to perform authentication of the user, as discussed further below. For other requests that are not addressed to access-protected target resources, DNS server 105 may resolve the corresponding network address in the regular manner and permit the client computing device 101 to access them. In this manner, DNS server 105 may perform address resolution and rerouting functions in a manner transparent to the user and to their client computing device 101.

Operation 403 may involve redirecting requests from a client computing device through a proxy server. For example, in system 100, when a user of a client computing device 101 requests access to an access-protected target resource 107-109, access service 104 may be configured as a proxy server that receives such requests, determines whether they match a list or mapping of access-protected target resources 107-109, and if they do match, reroutes them to security server 103. For requests not addressed to access-protected target resources 107-109, the proxy server may pass the communications through to their intended network address without redirection. This technique thus may also provide a transparent rerouting solution from the standpoint of users and their client computing devices.

Operation 404 may involve redirecting requests from a client computing device using a software agent integrated onto the client computing device itself (e.g., as part of a security application) or onto a particular access-protected target resource. In either type of configuration, the software agent may operate in a manner similar to the proxy server discussed above. For example, the agent may monitor outgoing communications from the client computing device or communications received at the target resource, determine whether the communications are addressed to an access-protected target resource, and if a communication is so addressed, the agent may reroute the communication (e.g., through address modification or other forms of packet modification) to the security server 103. In some embodiments, the agent may use a filtering or intercepting technique such as WINDOWS FILTERING PLATFORM, or similar application programming interface techniques adapted for other operating systems.

Operation 405 involves receiving requests from client computing devices at a portal, and determining at the portal whether they should be directed, or redirected, to security server 103 or passed through to their specified address. For example, in some embodiments, an enterprise seeking to implement disclosed techniques of dual-mode, passwordless authentication may deploy a web-based portal that provides links to various different applications. Some or all of the applications may be access-protected target resources that require authentication before a user can access them. Users may click on links corresponding to the target resources they wish to access. The portal may manage the links using Lightweight Directory Access Protocol (LDAP), may provide hyperlinks (e.g., HTTP links), or use other techniques. In some embodiments, the portal may execute through a server remote to the client computing device, while in other embodiments the portal may be an application running on the client computing device (e.g., a security application, as discussed above).

In operation 406, process 400 may further generate a unique session identifier for the user. As discussed above in connection with FIG. 3, the unique session identifier may be a variety of different types of identifiers that the client computing device can receive and relay back to the security server 103. Examples include barcodes 302, QR codes 304, images or icons 306, text strings 308, graphical patterns 310, colors 312, and more.

In some embodiments, the generated unique session identifier is selected from a database of already-created unique session identifiers. In other embodiments, the unique session identifier is created on-the-fly, in response to the request from the client computing device. For example, the entire unique session identifier may be newly created, or a portion of it (e.g., beginning characters, ending characters, etc.) may be uniquely modified on-the-fly. In some embodiments, the unique session identifier is unique to the user, unique to the request from the client computing device, or unique to both. For example, the unique session identifier may be a one-time use identifier that expires and is not reused.

In operation 407, the unique session identifier may be provided to the user. For example, the unique session identifier may be sent from the security server 103 to the client computing device 101 that transmitted the request identified in operation 401. Once the unique session identifier is received by the client computing device 101, it may be reproduced to the user through hardware and software components of the client computing device 101. For example, the unique session identifier may be displayed on a display screen (e.g., as part of a JavaScript file, HTML page, as part of the security application, etc.), rendered via a loudspeaker, or otherwise presented to the user.

In operation 408, a prompt may be issued for a physical (e.g., biometric, biological, etc.) identification of the user. As discussed above, the physical authentication of the user may be performed using software and hardware components of the client computing device. Examples discussed above in connection with FIG. 3 include facial recognition 301/303, retinal scan recognition 305, voice recognition 307, heart rate recognition 309, fingerprint identification 311, or other similar physical authentication techniques. In some embodiments, the physical authentication is performed entirely on the client computing device. For example, the client computing device may store a reference copy (or hash) of physical identification data associated with the user, and once the user attempts to physically authenticate themselves, the attempt may be compared with the reference data. For example, a stored representation of the user's face may be used as a reference, and a newly captured image of the user's face (e.g., captured via a camera) may be compared to it for authentication. A result of the physical authentication on the client computing device (e.g., expressed as "yes," "no," or a probability of authentication) may be transmitted to the security server 103, as discussed below. In embodiments where reference physical information of the user is stored on the client computing device, it may be stored in a secure memory (e.g., APPLE SECURE ENCLAVE, ANDROID SECURE ELEMENT, etc.). In other embodiments, part of the physical authentication may be performed remotely (e.g., at security server 103). For example, security server 103 may store the reference physical information, and the client computing device may send it captured physical data for comparison purposes.

In operation 409, the user may return the unique session identifier that they received to the security server 103. For example, if the unique session identifier is a QR code, the user may optically scan the received QR code (e.g., using a camera), and send back to the security server a copy of the QR code, a decoded version of its contents, or an encrypted version of its contents. In some embodiments, operations 408 and 409 occur close in time (e.g., simultaneously, nearly simultaneously, within a timed period subject to a timeout, within a time-limited session connection, etc.). That is, the user of the client computing device may be required to perform the physical authentication of themselves substantially at the same time that they receive the unique session identifier from the security server 103 or are prompted to return the unique session identifier back to the security server 103.

In some embodiments, as part of operation 409 the user may also transmit to the security server 103 a user identifier or user identification information. For example, in situations where the user creates a profile or account with personal information on the client computing device (e.g., in the security application), some or all of that identifying information may also be transmitted to the security server 103 to facilitate the authentication of the user. In such situations, the authentication of the user may be based on the physical authentication, the returned unique session identifier, and the transmitted identifying information about the user. These three forms of authentication information may be transmitted individually in separate communications or collectively in a single communication to security server 103.

Further, in some embodiments, the client computing device also transmits to the security server 103 a network address (e.g., domain name, IP address, MAC address, resource name, etc.) that the user was requesting access to. For example, the address may be associated with the access-restricted target resources 107-109 to which the user is seeking secure access. As discussed below, this address information may then be used to facilitate a secure connection between the client computing device 101 and the requested access-restricted target resource 107-109.

In operation 410, if the dual-mode, passwordless authentication of the user is successful, security server 103 may further facilitate or establish a secure connection between the client computing device 101 and the requested access-restricted target resource 107-109. In some embodiments, a security policy at the security server 103 may determine what operations to perform based on the successful authentication. For example, based on the successful authentication, the policy may decide to establish a secure tunnel (e.g., based on Secure Shell, IPSec, SSTP, etc.) between the client computing device 101 and the requested access-restricted target resource 107-109. The requested access-restricted target resource 107-109 may be running or instantiated on demand in a virtualized environment, as described above, such as through a virtual machine, container instance, or serverless code instance. In some embodiments, the client computing device 101 may thus obtain a direct connection to the requested access-restricted target resource 107-109 without having to connect to the network hosting the requested access-restricted target resource 107-109. Of course, the client computing device 101 may be connected to the requested access-restricted target resource 107-109 through techniques other than tunnels as well. In further embodiments, the security policy considers other factors (e.g., the user's geographical location) to determine whether the user is permitted to access the access-restricted target resource 107-109.

In some embodiments, the security server 103 both performs the passwordless authentication of the user and also logs the user in to the requested access-restricted target resource 107-109. Thus, for example, if the requested access-restricted target resource 107-109 is an ORACLE database server or a FACEBOOK account, the user may be logged in to the account automatically and transparently by the security server 103. If such techniques involve obtaining a secret for the log-in process, the security server 103 may obtain the required secret on the user's behalf (e.g., from vault 106). The log-in process on behalf of the user may be performed, for example, through a Security Assertion Markup Language (SAML) authentication process.

Figure 5:
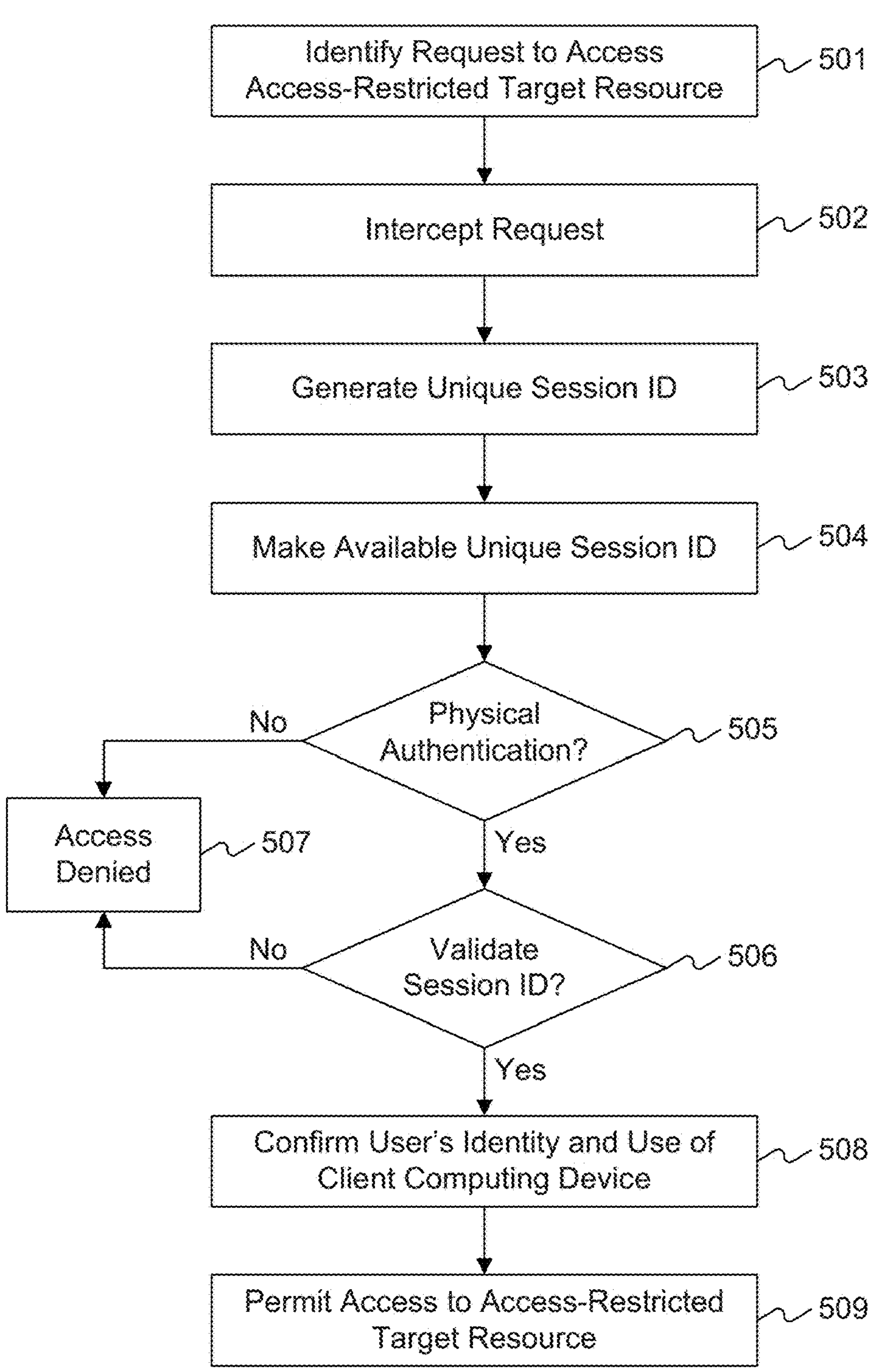
FIG. 5 is another flowchart of passwordless authentication of a user, in accordance with disclosed embodiments.

FIG. 5 is another flowchart of a process 500 for passwordless authentication of a user consistent with disclosed embodiments. Similar to process 400, process 500 may be implemented in accordance with the systems of FIG. 1 or 7-10.

In an operation 501, process 500 may identify a request by a user to access an access-restricted target resource. For example, the user may be operating on a client computing device 101 and the request may be associated with a network address for an access-restricted target resource 107-109. As discussed above in connection with FIG. 5, operations 401-405, the request from the user may be identified in various different ways (e.g., communications monitoring, receipt at a DNS server, receipt at a proxy server, receipt at an agent, receipt at a portal, etc.).

In an operation 502, process 500 may include intercepting the request before the request can reach the access-restricted target resource. For example, as discussed above in connection with operations 402-405 of FIG. 4, the request may be intercepted in various different ways (e.g., DNS redirection, proxy server redirection, agent-based redirection, portal-based redirection, etc.).

In an operation 503, process 500 may include generating a unique session identifier for the user. For example, in connection with operation 406 of FIG. 4, a unique session identifier may be generated, accessed from a database, or partially manipulated to make it unique. The unique session identifier may be unique to the user, unique to the request from the user, or both. Further, in some embodiments, the request specifies the address of the requested access-restricted target resource (e.g., IP address, MAC address, domain name, resource name, etc.).

In an operation 504, process 500 may include making available the unique session identifier to the user of the client computing device. For example, as discussed above in connection with FIG. 4, operation 407, the unique session identifier may be visually displayed to the user (e.g., via a display screen), audibly rendered (e.g., via a loudspeaker), or through other techniques.

In an operation 505, process 500 may include performing dual-mode, passwordless authentication of the user. The authentication may include confirming a result of a physical authentication of the user based on one or more unique physical characteristics of the user. For example, as discussed above in connection with FIGS. 2-4, this may include performing a biometric or biological authentication of the user, or an analysis of physical characteristics of the user or their behavior. The dual-mode, passwordless authentication may further include receiving, from the client computing device, the unique session identifier that was made available to the user. For example, if the unique session identifier is scanned by the client computing device (e.g., using a camera), it (or a representation of it) may be returned back to the security server 103.

Further, the dual-mode, passwordless authentication may further include an operation 506 of validating the received unique session identifier with respect to the result of the physical authentication. Thus, for example, the identity of the user may be confirmed both in terms of their physical authentication and also in terms of their ability to return a received unique session identifier. Further, as discussed above, the authentication may also include providing personal identification information (e.g., as stored on the client computing device) to the security server 103, which is further used to authenticate the user. As discussed above, the dual-mode, passwordless authentication may perform each component of the authentication of the user simultaneously or close-in-time. In this manner, the user is authenticated in terms of their physical presence, and also their current presence in front of (or operation of) the client computing device. Accordingly, in an operation 508, process 500 confirms, based on the dual-mode, passwordless authentication of the user, the identity of the user and the user's current use of the client computing device.

As illustrated in FIG. 5, if either or both of operations 505 and 506 are not successful for authenticating the user of the client computing device, access may be denied in an operation 507. In other words, the security server 103 may determine not to facilitate or establish a connection between the client computing device and the requested access-restricted target resource 107-109.

On the other hand, if the authentication in operations 505 and 506 is successful, operation 509 may include permitting, based on the confirmation, the user to access the access-restricted target resource. For example, as discussed above in connection with operation 410 of FIG. 4, the security server 103 may establish a secure tunnel between the client computing device 101 and the requested access-restricted target resource 107-109, and may further log the user into an account associated with the requested access-restricted target resource 107-109.

Figure 6:
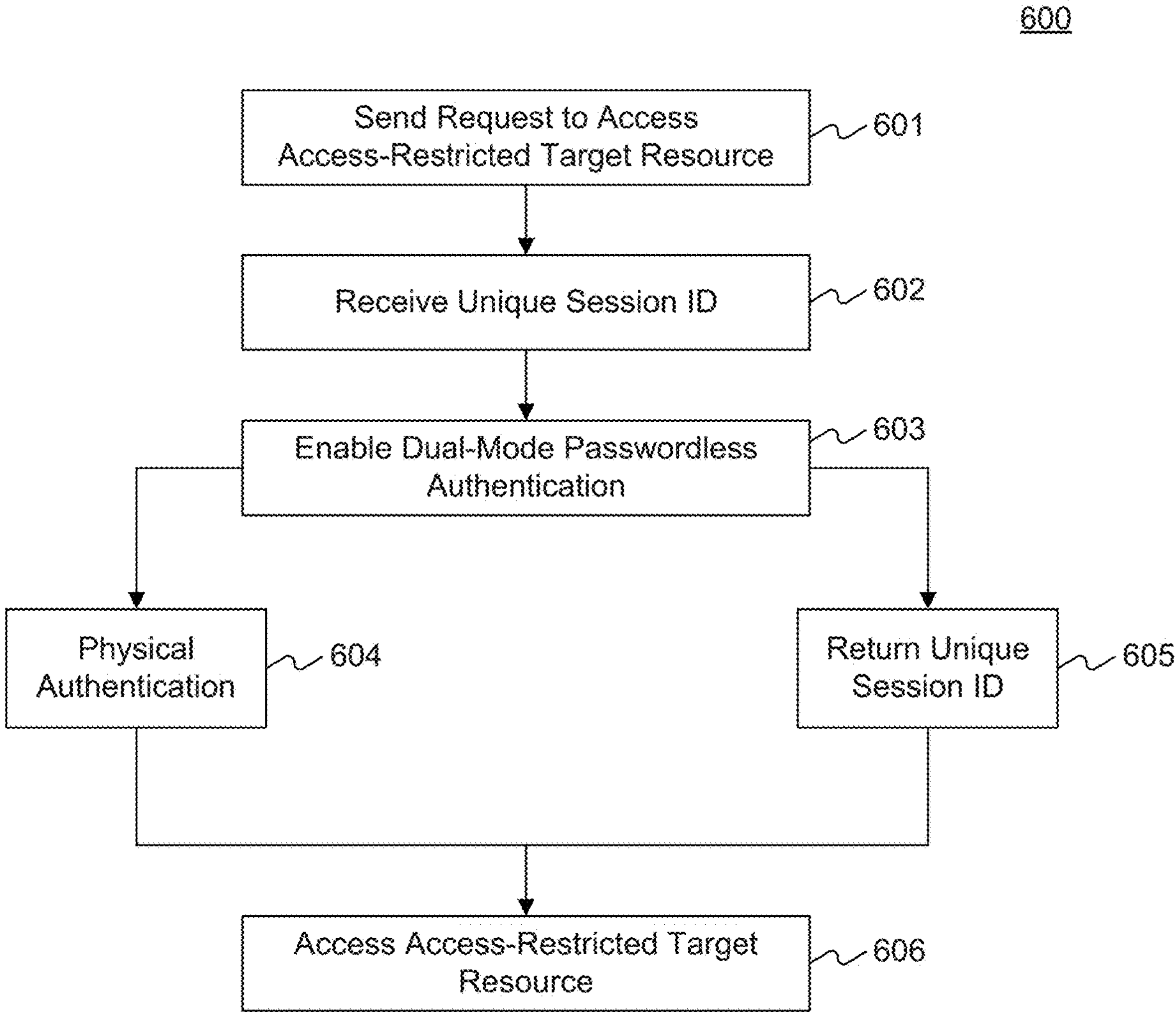
FIG. 6 is a further flowchart of passwordless authentication of a user, in accordance with disclosed embodiments.

FIG. 6 is a further flowchart of a process 600 for passwordless authentication of a user consistent with disclosed embodiments. Similar to processes 400 and 500, process 600 may be implemented in accordance with the systems of FIG. 1 or 7-10.

In an operation 601, process 600 may include sending a request, from the client computing device, for a user of the client computing device to access an access-restricted target resource. For example, as discussed above in connection with operation 401 of process 400, and operation 501 of process 500, the request may be associated with a network address (e.g., IP address, MAC address, resource name, etc.) for the access-restricted target resource.

Process 600 may also include an operation 602 of receiving, from a security server and in response to the request, a unique session identifier for the user. For example, as discussed above regarding operation 406 of process 400, and operation 503 of process 500, the unique session identifier may be created or accessed by security server and sent to the client computing device for display or rendering to the user.

In an operation 603, process 600 may include performing steps to enable dual-mode, passwordless authentication of the user. As discussed above in connection with operations 408 and 409 of process 400, and operations 505-508 of process 500, the steps may include performing a physical authentication of the user based on one or more unique physical characteristics of the user, and returning, to the security server for validation with respect to a result of the physical authentication, the received unique session identifier. Further, as discussed above, the client computing may also send to the security server personal information associated with the user (e.g., name, title, contact information, etc.) and the network address of the access-restricted target resource the user is attempting to access. As illustrated in process 600, the physical authentication may occur in operation 604 (e.g., based on physical authentication hardware and software on the client computing device) and the unique session identifier may be returned in operation 605.

In operation 606, conditional on a successful dual-mode, passwordless authentication of the user by the security server, process 600 may also include accessing the access-restricted target resource. For example, the client computing device may directly access the requested access-restricted target resource, may access the access-restricted target resource through a secure tunnel established by the security server, or may connect to the requested access-restricted target resource through other techniques (e.g., REMOTE DESKTOP PROTOCOL (RDP), APPLE REMOTE DESKTOP, CHROME REMOTE DESKTOP, etc.). The user may then interact with the requested access-restricted target resource in a secure, seamless manner, and without having been required to provide a password for such access.

In several of the above embodiments, the described techniques used as an example implementation an enterprise with network resources, where users (e.g., employees or account holders) may seek access to the resources. Nevertheless, as discussed below in connection with FIGS. 7-10, other implementations are possible as well.

Figure 7:
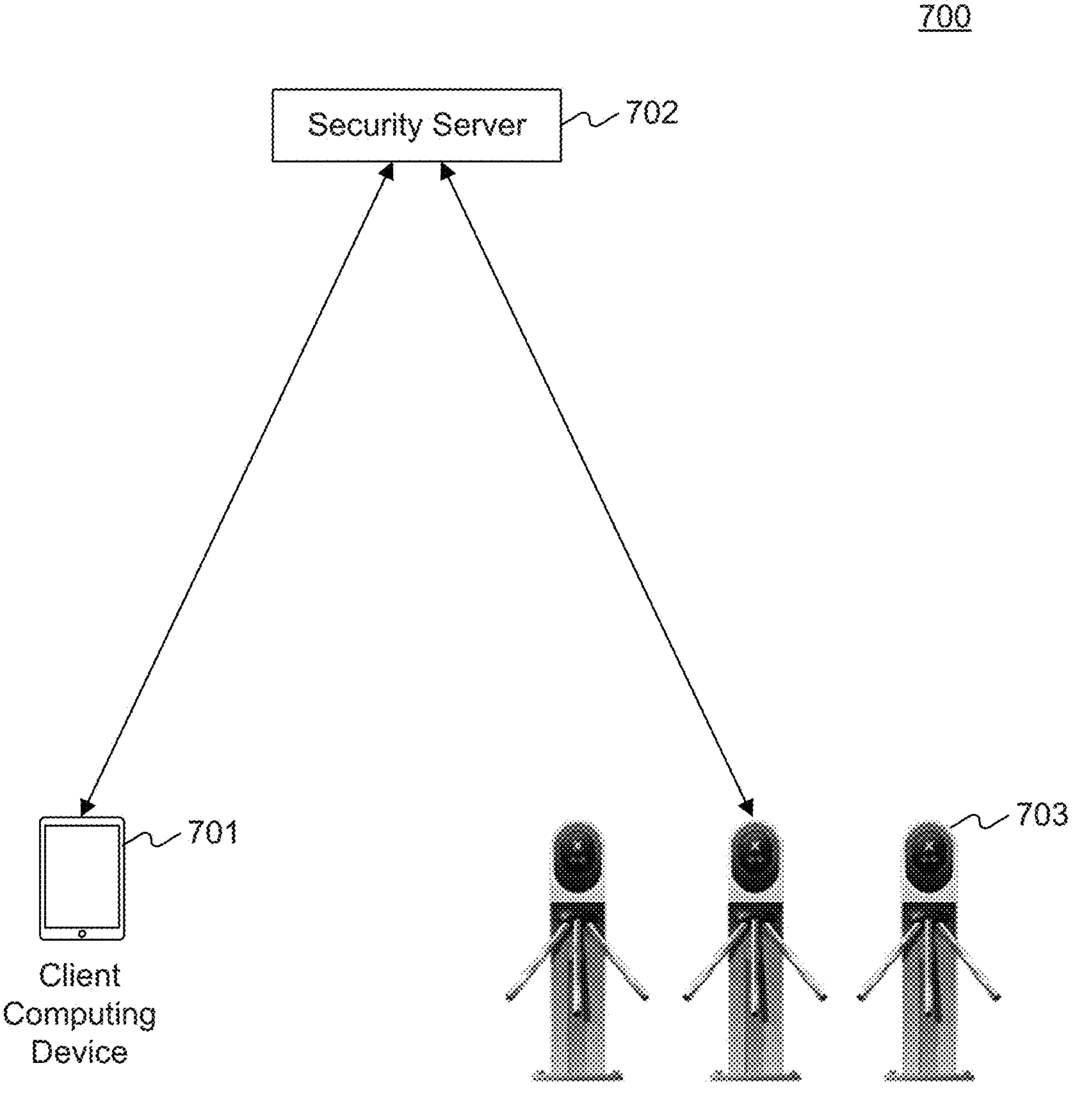
FIG. 7 is an illustration of an exemplary system for passwordless authentication of a user at a building security location, in accordance with disclosed embodiments.

FIG. 7 is an illustration of an exemplary system 700 for passwordless authentication of a user at a building security location consistent with disclosed embodiments. For example, a user of client computing device 701 may seek access to an access-restricted building through a security perimeter 703 (e.g., turnstiles, elevator, secure door, escalator, etc.). In such an implementation, the client computing device 701 may be, for example, a smartphone, wearable device, employee identification device, etc. When the user approaches the security perimeter 703, the client computing device 701 may transmit to (or receive from) the security perimeter 703 a communication indicating that the user is seeking access beyond the security perimeter 703.

Consistent with the embodiments described above, the request from the client computing device 701 may include personal information associated with the user (e.g., name, title, contact information, etc.) and an address (e.g., IP address, MAC address, Bluetooth ID, resource name, etc.) of the security perimeter 703 device it is communicating with. Alternatively, the request may be addressed to security server 702. If the request is not addressed to security server 702, it may be intercepted through various different techniques, as discussed above, and rerouted to security server 702.

Once the request is received at security server 702, a process of dual-mode, passwordless authentication of the user may be performed. As discussed above, this may involve a physical authentication of the user (e.g., using a camera or fingerprint function on the client computing device 701 or similar components integrated into security perimeter 703 itself) and the user returning a unique session identifier (e.g., barcode, QR code, image, color, etc.) that it receives from security server 702. As discussed above, the authentication may also be based on the user's identity, as confirmed through personal information sent from client computing device 701 to security server 702. If the dual-mode, passwordless authentication of the user is unsuccessful, access beyond the security perimeter 703 may be denied, while a successful authentication may result in security server 702 permitted the user access beyond the security perimeter 703.

Figure 8:
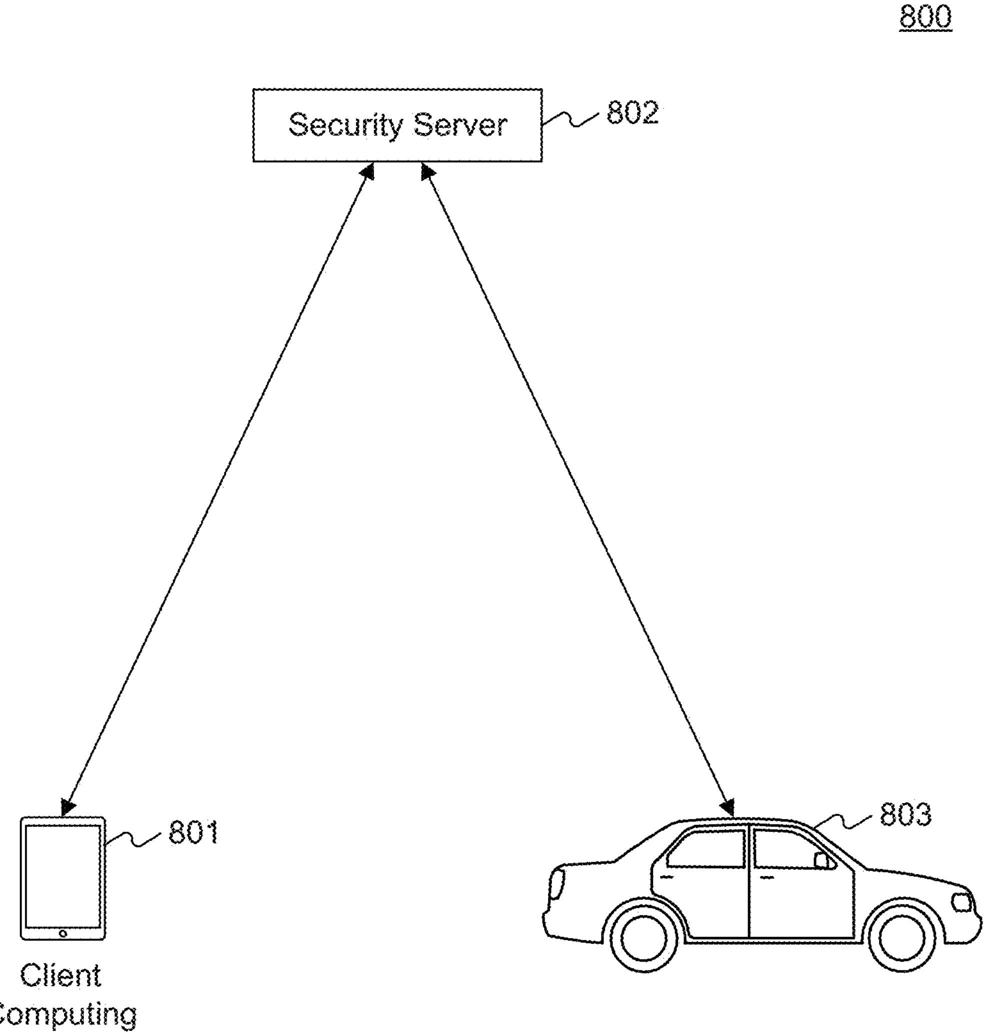
FIG. 8 is an illustration of an exemplary system for passwordless authentication of a user at a vehicle, in accordance with disclosed embodiments.

FIG. 8 is an illustration of an exemplary system 800 for passwordless authentication of a user at a vehicle consistent with disclosed embodiments. For example, a user of a client computing device 801 may seek access to operate a vehicle 803 (e.g., turn the vehicle on) or to perform a function within the vehicle (e.g., download a software update, access navigation software, make an in-vehicle purchase, etc.). In such embodiments, the client computing device 801 may be, for example, a smartphone, wearable device, key fob device, part of the vehicle 803's infotainment system, etc.

When the user of client computing device 801 seeks to operate the vehicle 803, or a function within the vehicle 803, the client computing device 801 may send to (or receive from) the vehicle a communication indicating that the user is seeking such access. As discussed above, the request may be addressed to the vehicle 803 or to security server 802. If the request is not addressed to security server 802, it may be intercepted and rerouted to security server 802, consistent with above embodiments.

Once the request is received by security server 802, a process of dual-mode, passwordless authentication of the user may be performed. For example, this may include a physical authentication of the user (e.g., using a camera or sensor built into the client computing device 801 or into the vehicle 803). The authentication may also involve the user returning a unique session identifier that it receives from the security server and/or validating personal information received from the client computing device 801 regarding the user's identity. If the dual-mode, passwordless authentication is successful, the user may be permitted access to the requested operation of the vehicle 803. Otherwise, such access may be denied.

Figure 9:
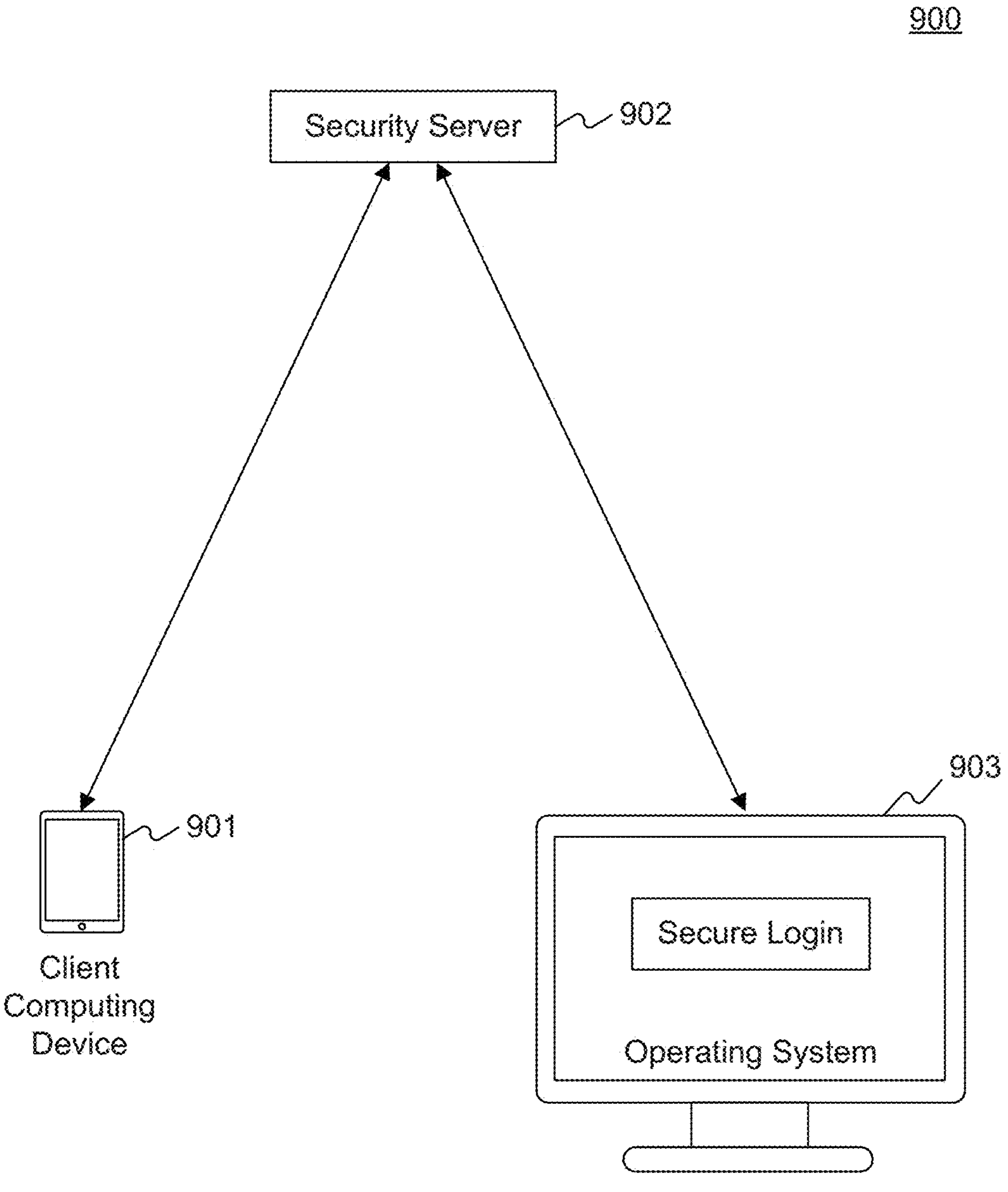
FIG. 9 is an illustration of an exemplary system for passwordless authentication of a user at a computing device, in accordance with disclosed embodiments.

FIG. 9 is an illustration of an exemplary system 900 for passwordless authentication of a user at a computing device consistent with disclosed embodiments. In such embodiments, a user of a client computing device 901 may be seeking to log into a computing device 903, such as a laptop, tablet, personal computer, etc. The computing device 903 and client computing device 901 may the same machine or different machines.

Rather than require the user to provide a password to log in to the operating system on computing device 903, the user may be authenticated in a dual-mode, passwordless technique, as discussed above. For example, the user may send a request to log in to the computing device 903, which may be received at the security server 902 or computing device 903. If received at the computing device 903, the request may be intercepted and rerouted to the security server 902, as discussed above.

A process of dual-mode, passwordless authentication of the user may then occur, including a physical authentication of the user (e.g., using a camera, sensor, or other component of client computing device 901) and prompting the user to return a unique session identifier that security server 902 sent to the client computing device. For example, the user may perform the physical authentication on their client computing device 901, while substantially at the same time receiving a QR code from security server 902, optically scanning the QR code using the client computing device 901, and returning the decoded QR code (or a representation of it) to security server 902. As discussed above, the authentication may also be based on personal information regarding the user's identity (e.g., received from a profile stored on the client computing device 901). If the authentication of the user is successful, the user may be logged in to the operating system on computing device 903. Otherwise, access to the operating system may be denied.

Figure 10:
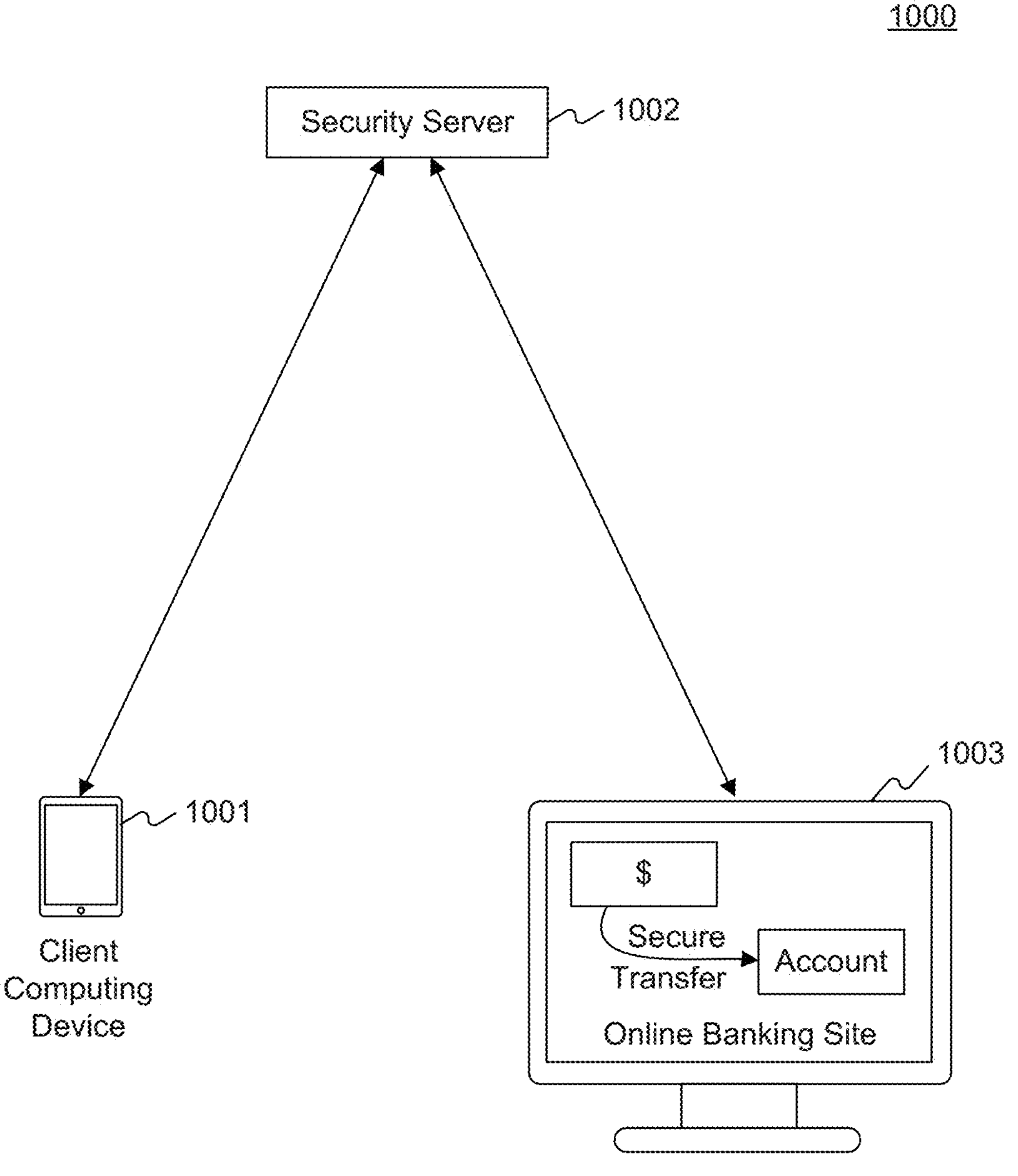
FIG. 10 is an illustration of an exemplary system for passwordless authentication of a user performing a secure transaction, in accordance with disclosed embodiments.

FIG. 10 is an illustration of an exemplary system 1000 for passwordless authentication of a user performing a secure transaction consistent with disclosed embodiments. For example, the user may be operating on a client computing device 1001 and seeking to perform a transaction with a third-party 1003 requiring authentication of the user. The transaction may involve, for example, an e-commerce purchase, personal loan, mortgage, credit application, etc.

When the user of client computing device 1001 seeks to participate in a transaction with third-party 1003, it may send a request to third-party 1003 (e.g., a request to a particular server, a request to participate in a transaction, a request to complete a transaction, etc.). The request may be received by security server 1002, or intercepted and rerouted to security server 1002.

A process of dual-mode, passwordless authentication of the user may then occur, including a physical authentication of the user, and the user returning a unique session identifier that it received from the security server 1002. Illustrations of how the dual-mode authentication may occur and provided, in exemplary form, in FIG. 3 above. In some embodiments, the user is further authenticated in terms of their identity, as confirmed based on personal information provided from client computing device 1001 to security server 1002. If the authentication of the user is successful, the user may be permitted to engage in the requested transaction with third-party 1003. Otherwise, permission may be denied.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for passwordless authentication of a user, the operations comprising:

identifying a request by a user to access an access-restricted target resource, the user operating on a client computing device and the request being associated with a network address for the access-restricted target resource;

intercepting the request before the request can reach the access-restricted target resource;

identifying a unique session identifier, the unique session identifier being a one-time use identifier associated with the request;

making available the unique session identifier to the user of the client computing device, wherein the making available comprises at least one of transmitting, displaying, or audibly presenting a representation of the unique session identifier to the user;

obtaining a result of an authentication of the user, wherein the authentication is based on:

a physical verification of the user through the client computing device based on one or more unique physical characteristics of the user and sensor data, receipt, from the client computing device, of the unique session identifier, and confirmation of the user's current physical presence at the client computing device; and conditional on the result of the authentication being successful, establishing a secure tunnel connection between the client computing device and the access-restricted target resource.

2. The non-transitory computer readable medium of claim 1, wherein the operations further comprise enabling a log-in of the user to an application.

3. The non-transitory computer readable medium of claim 2, wherein the log-in is performed transparently to the user.

4. The non-transitory computer readable medium of claim 2, wherein the operations further comprise obtaining a secret for use in the log-in.

5. The non-transitory computer readable medium of claim 4, wherein the secret is obtained from a secrets vault.

6. The non-transitory computer readable medium of claim 1, wherein the operations further comprise enabling the user, conditional on the result of the authentication being successful, to engage in an electronic transaction.

7. The non-transitory computer readable medium of claim 1, wherein the request is redirected through address resolution.

8. The non-transitory computer readable medium of claim 1, wherein the intercepting includes matching an address associated with the request with an address from a list.

9. The non-transitory computer readable medium of claim 8, wherein the list comprises addresses associated with the access-restricted target resource.

10. The non-transitory computer readable medium of claim 1, wherein the intercepting is performed transparently to the user.

11. A computer-implemented method for passwordless authentication of a user, the method comprising:

identifying a request by a user to access an access-restricted target resource, the user operating on a client computing device and the request being associated with a network address for the access-restricted target resource;

intercepting the request before the request can reach the access-restricted target resource;

identifying a unique session identifier, the unique session identifier being a one-time use identifier associated with the request;

making available the unique session identifier to the user of the client computing device, wherein the making available comprises at least one of transmitting, displaying, or audibly presenting a representation of the unique session identifier to the user;

obtaining a result of an authentication of the user, wherein the authentication is based on:

a physical verification of the user through the client computing device based on one or more unique physical characteristics of the user and sensor data, receipt, from the client computing device, of the unique session identifier, and confirmation of the user's current physical presence at the client computing device; and conditional on the result of the authentication being successful, establishing a secure tunnel connection between the client computing device and the access-restricted target resource.

12. The computer-implemented method of claim 11, wherein the unique session identifier is a barcode.

13. The computer-implemented method of claim 11, wherein the unique session identifier is quick-response (QR) code.

14. The computer-implemented method of claim 11, wherein the unique session identifier is an image.

15. The computer-implemented method of claim 11, wherein the unique session identifier is displayed to the user via a screen of a mobile device.

16. The computer-implemented method of claim 11, wherein the physical verification of the user comprises a biometric verification.

17. The computer-implemented method of claim 16, wherein the biometric verification is performed by a mobile device of the user.

18. The computer-implemented method of claim 11, wherein the physical verification of the user and the confirmation of the user's current physical presence at the client computing device are performed simultaneously.

19. The computer-implemented method of claim 11, wherein the physical verification of the user and the confirmation of the user's current physical presence at the client computing device are performed within a time limit.

20. The computer-implemented method of claim 11, wherein the physical verification of the user and the confirmation of the user's current physical presence at the client computing device are performed after the request.

* * * * *